July 9, 1957
A. PAUL
2,798,729
CARRIER FOR THE TRANSPORT OF AIRCRAFT ON THE GROUND
Filed March 30, 1956
3 Sheets-Sheet 1
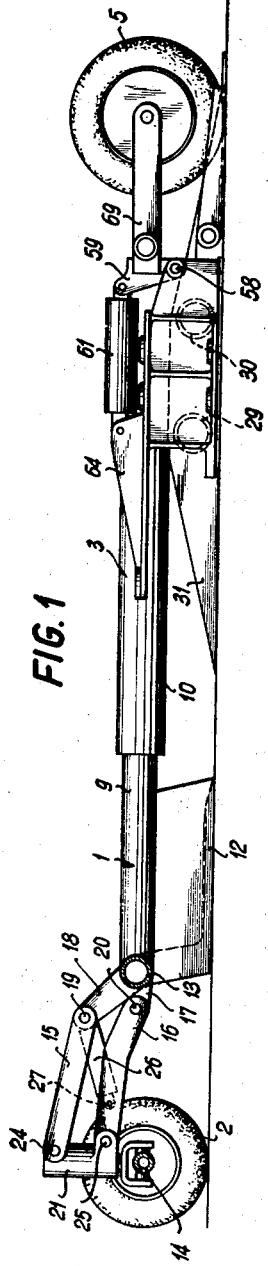
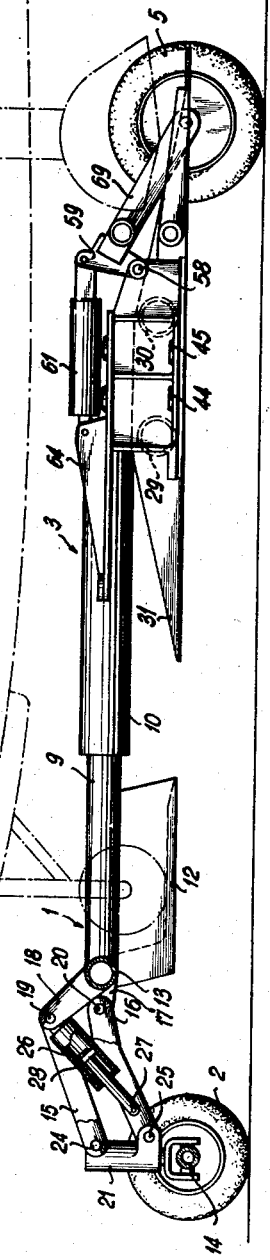
INVENTOR:
ADOLF PAUL
by
Richardson, David and Nordon
Atty's.

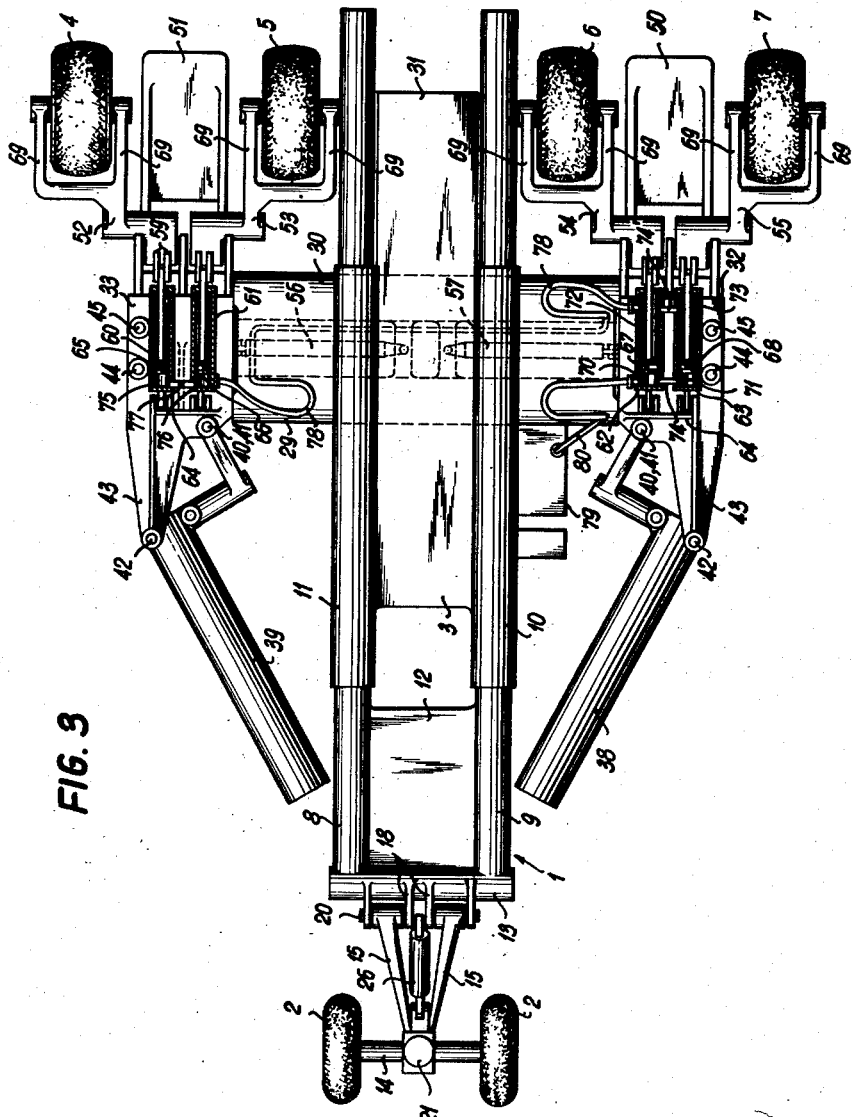

INVENTOR:
ADOLF PAUL

United States Patent Office 2,798,729
Patented July 9, 1957

2,798,729

CARRIER FOR THE TRANSPORT OF AIRCRAFT ON THE GROUND

Adolf Paul, Moosburg, Germany, assignor to Steinbock G. m. b. H., Moosburg, Germany, a corporation of Germany Application March 30, 1956, Serial No. 575,067

Claims priority, application Germany April 6, 1955

5 Claims. (Cl. 280—35)

The present invention relates to a novel carrier especially suited for the transport of aircraft on the ground. More particularly, it relates to a carrier provided with lifting mechanism to raise an aircraft off the ground and so to hold the aircraft during transportation along the ground surface.

The advent of modern pursuit aircraft requires far-reaching protection against wear and tear of these machines on the ground. For this purpose specifically designed carriers are required, provided with mechanism for raising the aircraft off the ground. On the other hand, in spite of the large wheel span of the aircraft, the carrier must not itself have too large a wheel span so that it can travel along relatively narrow roads. Because of the considerable weight of the aircraft, up to about 14 tons, it is desirable that the carrier be strong but nevertheless relatively light in weight.

It is accordingly an object of the present invention to provide a novel carrier suited for transportation of aircraft over land surfaces.

It is a further object of the invention to provide a carrier of the class described which is adapted to traverse roads of different widths and can even accommodate itself to relatively narrow roads.

Another object of the invention is to provide a carrier adapted to transport aircraft of different lengths and different wheel spans, the adaptation from a state for carrying a craft of one size to a state for carrying a craft of a different size being made quickly and simply.

Still another object of the invention is to provide a carrier of light weight which can receive a relatively heavy aircraft and maintain same in a stable condition with a minimum of shifting even when relatively uneven road surfaces are encountered.

In accordance with the present invention, there is provided a longitudinally extending carrier on either side of the longitudinal axis of which there are provided several wheels or wheel sets, each of said sets being carried by an individual swinging arm. The carrier also includes a hydraulic lifting apparatus composed of pistons and cylinders on each side of the longitudinal axis. To equalize the pressure within the several cylinders they are in communication with each other so that hydraulic fluid in a cylinder on one side of the axis will be shifted to a cylinder on the other side of the axis upon operation of one of the pistons. The cylinders are operatively connected with swinging arms which carry the wheel sets. In addition, shoes are provided for the wheels of the aircraft, these shoes being so positioned that the forward wheels of the aircraft, which carry 80–85% of the aircraft's weight, are substantially laterally aligned with the load bearing wheels of the carrier.

The foregoing objects and advantages will now be described more fully with reference to the accompanying drawing showing one embodiment of a carrier produced in accordance with the present invention, and wherein:

Fig. 1 is a vertical section through the longitudinal axis of a carrier with the front portion thereof shown in elevation, the carrier being shown in lowered position;

Fig. 2 is a view similar to Fig. 1 with the carrier in raised position and with an aircraft shown thereon in dot-and-dash lines;

Fig. 3 is a top plan view of the carrier of Fig. 1 shown in retracted position.

Figure 4:
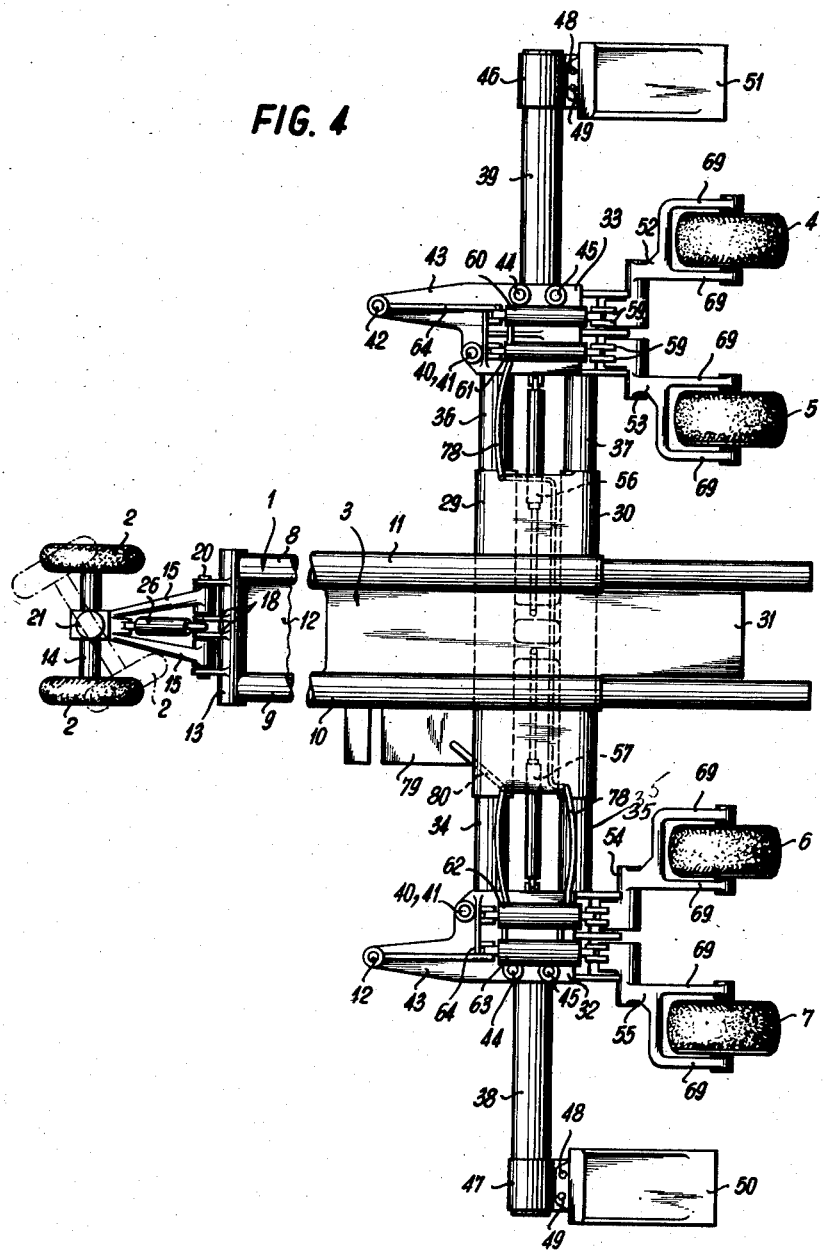
Fig. 4 is a top plan view of the carrier of Fig. 1 shown in expanded position suitable for receiving an aircraft thereon.

Referring now more particularly to the drawings, the carrier as shown in Figs. 1 and 2 is composed of two portions, viz., the forward frame portion 1 with the attached guiding wheels 2 and the rearward frame portion 3 with attached following wheels 4, 5, 6 and 7. The forward frame portion 1 is formed of two parallel tubes 8 and 9 which with their rear ends extend adjustably into two tubes 11 and 10, respectively, of the rearward frame portion 3. Adjacent their forward ends, the tubes 8 and 9 are connected by a transverse member 13 and a welded shoe 12 which in Fig. 1 rests on the ground for receiving the forward wheel of an airplane, shown in dot-and-dash lines in Fig. 2.

Forward frame portion 1 is connected with the axle 14 of wheel pair 2 by means of two pairs of parallel lever arms 15 and 16. The lever arms 15 and 16 are connected at one end with extensions 17 and 18 projecting from transverse member 13 by bolts 19 and 20, respectively, and at their other ends with the bearing bushing 21 for the axle 14 by means of bolts 24 and 25, respectively. Diagonally extending between arms 15 and 16 is a hydraulic jack, the cylinder 26 of which is connected to arm 15 by bolt 19 while its piston 28 is connected to arm 16 by bolt 27. By admitting fluid into the cylinder 26, the forward frame portion 1 is raised together with the shoe 12 from the position shown in Fig. 1 to the position shown in Fig. 2 wherein the shoe is maintained above the ground in transporting condition.

The rearward frame portion 3 additionally includes two tubular transverse members 29 and 30 secured to the undersides of tubes 10 and 11, e. g. by welding. Over these transverse members a bridging plate 31 is carried between tubes 10 and 11, for the forward wheel of the airplane to ride over the plate 31 in passing toward shoe 12.

Tubes 34, 35 extend telescopingly into tubes 29, 30 on one side of the longitudinal axis of the carrier, and their projecting ends are welded to a wheel holder 32. On the other side of the longitudinal axis, tubes 36, 37 are welded to wheel holder 33 and are similarly arranged with respect to tubes 29, 30.

A pair of arms 38, 39 are pivotally connected with holders 32 and 33, respectively, for accommodating aircraft of greater wheel span. The arms 38, 39 are each pivotally connected with the holders 32, 33, respectively, at pivots 40 by means of bolts 41 and are releasably secured to pivots 42 on extensions 43 of the holders as shown in Fig. 3 for receiving aircraft of narrow wheel span. For accommodating aircraft of broader wheel span, the pivots 42 are released and the arms 38, 39 are pivoted in a substantially horizontal plane about bolts 41 until they arrive at the position shown in Fig. 4 in which they are held by bolts 44, 45.

Clamps 46, 47 are adjustably held on the arms 39, 38, respectively, and by means of conical bolts 48, 49 support carrier shoes 50, 51, respectively. Bifurcated levers 52, 53, 54 and 55 are arranged in pairs on either side of the longitudinal axis of the carrier and support the wheels 4, 5, 6 and 7, respectively. If it is desired to accommodate aircraft of narrower wheel span, the shoes 50, 51 are removed from the arms 38, 39, the latter collapsed and the shoes are suspended respectively between levers 52, 53 and 54, 55, as in Fig. 3 on suitable bolts (not shown). For further adjustment or for completely collapsing the structure to take as little space as possible when travelling empty, the tubes 34, 35 and 36, 37 may be telescoped into tubes 29, 30 from the position shown in Fig. 4 to that shown in Fig. 3 by means of hydraulic cylinders 56, 57. These cylinders may also be employed to provide adjustments when the arms 38, 39 are fully extended so that a wide range of wheel spans can be handled.

As shown in Figs. 1 and 2, the wheel holders 32, 33 are provided with a horizontally extending axle 58 about which extension pieces 59 secured to the arms 69 of the bifurcated levers 52, 53, 54 and 55, are pivotally mounted. The upper ends of the extension pieces 59 are pivotally connected to pistons 65, 66, 67 and 68, respectively (see Fig. 3) which pistons operate in cylinders 60, 61, 62 and 63, respectively. The cylinders are in turn pivotally connected to members 64 on the holders 32, 33. In this manner the hydraulic cylinders 60 to 63 are respectively operatively connected with the wheels 4 to 7 by means of the levers 52 to 55.

The cylinder spaces 70, 71 of cylinders 62, 63 are connected with each other by means of passageway 74 while the piston sides of these cylinders are in communication with each other by means of passageway 74'. Passageway 77 serves to connect the cylinder spaces 75, 76 of cylinders 60, 61. As a result, in the event that wheel 4 encounters an obstacle, wheel 5 is simultaneously raised initially; the pressure in the cylinder space 75 is doubled as a result of the removal of load from the wheel 5 and the consequent transfer to wheel 4 alone or the entire load previously carried by both wheels 4 and 5. The pressure in cylinder space 76 will disappear. However, over the passageway 77 which must be of sufficiently large cross-section, oil can flow from cylinder space 75 to cylinder space 76. As a result of such flow of oil, cylinder space 75 is decreased in volume due to displacement of piston 65 therein, and axle 58 and the appurtenant frame structure are lowered relative to the wheel structure which is raised together with its arm 69. Simultaneously, the displacement of oil into cylinder space 76 causes the corresponding arm 69 to pivot together with lever 53 about axle 58 until wheel 5 rests again upon the ground and the pressure within cylinder spaces 75 and 76 has been equalized and both wheels 4 and 5 carry equal portions of the load. Upon equalization of the pressure, the relative lowering of the axle 58 and the frame is terminated. Thus, the raising of the frame as a result of one wheel riding over an obstacle is partly compensated for by a simultaneous sinking thereof as a result of the above-described oil flow between cylinders 60 and 61, so that due to the coupling between wheels 4 and 5 the corresponding side of the carrier is raised only by half the height of the obstacle.

The spaces 72, 73 on the piston sides of cylinders 62, 63 and the cylinder spaces 75, 76 of cylinders 60, 61 are in communication with each other by means of pipeline 78, the spaces all being filled with oil or other hydraulic fluid. The oil is supplied from the pump 79 over the pressure pipeline 80 to cylinder spaces 70, 71 of cylinders 62, 63 so that the oil column in spaces 72, 73 is maintained under pressure and thus controls the displacement of the pistons 65, 66 in cylinders 60, 61 by means of the pipeline 78. The annular cross-section of spaces 72, 73 (the cross-section of one of the spaces minus the cross-section of the piston rod operating in said space) is equal to the cross-section of pistons 65, 66 operating in cylinders 60, 61. By means of this arrangement there is achieved an equal raising and lowering on both sides of the longitudinal axis of the carrier in response to the action of pump 79.

When the pump is not in operation, the cylinders 62, 63 with their pistons 67, 68 cooperate with levers 54, 55 and wheels 6, 7 to minimize the vertical displacement of the frame due to surface irregularities as described above with respect to wheels 4, 5.

In use, arms 38, 39 may be pivoted from the position shown in Fig. 3 to that of Fig. 4. Then shoes 50, 51 are placed in position on the ends of arms 38, 39 and hydraulic cylinders 56, 57 are operated to extend the respective tubes 34, 35 and 36, 37 so that the shoes will be spaced a distance corresponding to the wheel span of the aircraft to be transported. The front wheel of the aircraft is passed over plate 31 and then rests on shoe 12 at which time the rear wheels of the aircraft have also come to rest on shoes 50, 51. By introducing fluid into cylinder 26 the forward frame portion is raised to the position shown in Fig. 2. By pumping fluid from pump 79 through line 80 into cylinders 60, 61, 62, 63 the pistons of these cylinders are also pushed outwardly and the rear frame portion is also raised to the position shown in Fig. 2 so that all the carrier shoes are off the ground and so that the aircraft can be transported over the ground without contact therewith. Of course, the raising of the forward and rear frame portions is preferably effected simultaneously although the use of wheel chucks will permit either end to be raised or lowered separately of the other.

Various changes and modifications may be made without departing from the spirit and scope of the present invention and it is intended that such obvious changes and modifications be embraced by the annexed claims.

What I claim is:

1. A carrier for land travel comprising a frame having telescoping forward and rear portions, forward shoe means carried by said forward portion, forward guiding wheels, forward lever means pivotally connected with said frame and said forward guiding wheels, a pair of laterally extensible wheel holders connected with said frame and disposed on either side thereof at the rear portion thereof, shoe means carried by each of said holders, a plurality of rear lever means disposed on said holders, respectively, and connected therewith for pivotal movement in vertical direction, a plurality of rear wheels carried by said rear lever means, respectively, and a plurality of piston and cylinder sets, one of each set being connected with said frame and the other of each set being connected with one of said lever means, whereby introduction of fluid into said cylinders causes said pistons to be displaced to thereby raise said frame together with said forward and rear shoe means relative to said wheel means.

2. A carrier as defined in claim 1, wherein said rear lever means includes two levers on each holder, said levers each carrying a rear wheel, the cylinder spaces of the levers on each holder being in communication with each other, whereby surface irregularities encountered by a wheel are minimized and the displacement of the frame is substantially one-half that of the surface irregularity.

3. A carrier as defined in claim 2, wherein the cylinder spaces of one holder are connected with a pump, the piston sides of said cylinder spaces being in communication with each other and with the cylinder spaces of the levers of the other holder.

4. In a carrier for land travel, a plurality of levers pivoted on said frame for vertical movement and disposed on both sides of the longitudinal axis of said carrier, a plurality of wheels supported by said levers, respectively, and a plurality of longitudinally extensible means between said frame and said levers, respectively, and spaced from the pivot points between said levers and said frame, whereby extension of said extensible means causes said frame to be lifted relative to said wheels, said frame including a forward and rear portion, said carrier being further provided with shoes disposed at said forward and rear portion, respectively, whereby upon positioning a load on said shoes, extension of said extensible means serves to raise said frame together with said shoes and said load, and also including a pair of laterally extensible wheel holders disposed on said frame on either side of the longitudinal axis of said carrier, said levers being pivotally connected with said wheel holders, and said shoes on the rear portion of said frame being supported by said wheel holders, whereby the spacing between said shoes on said rear frame portion can be adjusted through lateral extension of said wheel holders.

5. A carrier for land travel comprising a frame having first and second longitudinally spaced portions, first and second lever means connected for vertical pivotal movement at the respective portions of said frame, first and second wheel means carried by said levers, respectively, and disposed symmetrically relative to the longitudinal axis of said frame, first and second shoe means carried by the respective portions of said frame, and a plurality of extensible means extending between each lever means and said frame, extension of said extensible means serving to pivot said lever means relative to their respective wheels to thereby raise said frame together with said shoe means, said frame including a pair of laterally extensible wheel holders disposed on either side of its longitudinal axis, said second lever means being pivotally connected to said wheel holders, and also including a pair of arms connected to said wheel holders, respectively, for pivotal movement in a horizontal plane from a position substantially parallel to the longitudinal axis of said frame to a position transverse thereto, said second shoe means being removably held on said arms when the latter are in extended position.

References Cited in the file of this patent

UNITED STATES PATENTS

| 2,232,972 | Ronning | Feb. 25, 1941 |
| 2,681,811 | Green | June 22, 1954 |
| 2,711,329 | Fritz | June 21, 1955 |